(12) United States Patent
Iruku et al.

(10) Patent No.: US 10,956,408 B2
(45) Date of Patent: Mar. 23, 2021

(54) DATA TRANSFORMATION TOOL

(71) Applicant: BANK OF AMERICA CORPORATION, Charlotte, NC (US)

(72) Inventors: Satya Iruku, Bordentown, NJ (US); Senthil Ramachandran, Singapore (SG); Prasad G S N V Ravva, Plainfield, NJ (US)

(73) Assignee: Bank of America Corporation, Charlotte, NC (US)

( * ) Notice: Subject to any disclaimer, the term of this patent is extended or adjusted under 35 U.S.C. 154(b) by 806 days.

(21) Appl. No.: 15/636,987

(22) Filed: Jun. 29, 2017

(65) Prior Publication Data
US 2019/0005091 A1   Jan. 3, 2019

(51) Int. Cl.
*G06F 16/242* (2019.01)
*G06F 16/38* (2019.01)
*G06F 16/832* (2019.01)
*G06F 16/25* (2019.01)
*G06F 16/2453* (2019.01)

(52) U.S. Cl.
CPC .......... *G06F 16/242* (2019.01); *G06F 16/258* (2019.01); *G06F 16/381* (2019.01); *G06F 16/832* (2019.01); *G06F 16/24534* (2019.01)

(58) Field of Classification Search
CPC .. G06F 16/2453; G06F 16/242; G06F 16/381; G06F 16/832; G06F 16/258; G06F 16/24534; G06F 16/254; G06F 16/214; G06F 16/283; G06F 16/284
See application file for complete search history.

(56) References Cited

U.S. PATENT DOCUMENTS

| | | | |
|---|---|---|---|
| 7,774,298 B2 | 8/2010 | Trivedi et al. | |
| 8,108,534 B2 | 1/2012 | Carroll et al. | |
| 9,098,315 B1 | 8/2015 | Kapoor et al. | |
| 9,633,094 B2 * | 4/2017 | Rambo | G06F 16/215 |
| 9,734,222 B1 * | 8/2017 | Milne | G06F 16/258 |

(Continued)

OTHER PUBLICATIONS

Chisholm, Malcolm, Managing Reference Data in Enterprise Databases, 2001, Academic Press, pp. 1-2 (Year: 2001).*

(Continued)

*Primary Examiner* — Tamara T Kyle
*Assistant Examiner* — Lana Alagic
(74) *Attorney, Agent, or Firm* — Michael A. Springs

(57) ABSTRACT

A data transformation tool includes a receiver, an extraction engine, a transformation engine, and a delivery engine. The receiver receives from a user a request indicating an identifier for reference data, a format, and a delivery type. The reference data includes a data field, a list of permissible values for the data field, and a textual description of the data field. The extraction engine generates, based on the request, a database query requesting reference data identified by the identifier from a database and communicates the query to the database. The transformation engine receives, from the database, the reference data in response to communicating the query to the database and transforms the received reference data into a flat file based on the format indicated by the request. The delivery engine delivers the flat file to the user according to the user using the deliver type indicated by the request.

20 Claims, 3 Drawing Sheets

FIG. 1

(56) References Cited

U.S. PATENT DOCUMENTS

| | | | | |
|---|---|---|---|---|
| 2007/0160198 A1* | 7/2007 | Orsini | .................. | H04L 9/3247 |
| | | | | 380/28 |
| 2007/0255717 A1 | 11/2007 | Baikov et al. | | |
| 2012/0005151 A1* | 1/2012 | Vasudevan | ............ | G06F 16/283 |
| | | | | 707/600 |
| 2015/0207705 A1* | 7/2015 | Piercey | ................. | H04L 63/102 |
| | | | | 709/223 |
| 2016/0344751 A1* | 11/2016 | Leach | .................... | G06Q 30/04 |
| 2017/0223046 A1* | 8/2017 | Singh | .................... | H04L 43/062 |

OTHER PUBLICATIONS

Chen et al. "A Practical Guide to Managing Reference Data with IBM InfoSphere Master Data Management Reference Data Management Hub", May 2013, IBM Redbooks, First Edition. (Year: 2013).*

* cited by examiner

DATA TRANSFORMATION TOOL

TECHNICAL FIELD

This disclosure relates generally to a data transformation tool.

BACKGROUND

An organization may use databases to store data about itself and its clients. Different users in the organization may generate their own databases using subsets of data from the organization's databases.

SUMMARY OF THE DISCLOSURE

According to an embodiment, a data transformation tool includes a receiver, an extraction engine, a transformation engine, and a delivery engine. The receiver receives from a user a request indicating an identifier for reference data, a format, and a delivery type. The reference data includes a data field, a list of permissible values for the data field, and a textual description of the data field. The extraction engine generates, based on the request, a database query requesting reference data identified by the identifier from a database and communicates the query to the database. The transformation engine receives, from the database, the reference data in response to communicating the query to the database and transforms the received reference data into a flat file based on the format indicated by the request. The delivery engine delivers the flat file to the user according to the user using the deliver type indicated by the request.

According to another embodiment, a method includes receiving from a user a request indicating an identifier for reference data, a format, and a delivery type. The reference data includes a data field, a list of permissible values for the data field, and a textual description of the data field. The method further includes generating, based on the request, a database query requesting the reference data identified by the identifier from a database and communicating the query to the database. The method also includes receiving, from the database, the reference data in response to communicating the query to the database and transforming the received reference data into a flat file based on the format indicated by the request. The method includes delivering the flat file to the user according to the user using the deliver type indicated by the request.

According to yet another embodiment, a system includes a database and a database transformation tool. The database stores reference data. The reference data includes a data field, a list of permissible values for the data field, and a textual description of the data field. The data transformation tool receives from a user a request indicating an identifier for reference data, a format, and a delivery type and generates, based on the request, a database query requesting the reference data identified by the identifier from the database. The data transformation tool communicates the query to the database and receives, from the database, the reference data in response to communicating the query to the database. The data transformation tool also transforms the received reference data into a flat file based on the format indicated by the request and delivers the flat file to the user according to the user using the deliver type indicated by the request.

Certain embodiments provide one or more technical advantages. For example, an embodiment improves the database creation process by providing reference data in any requested format so that a database of any type can be generated. As another example, an embodiment reduces network, processor, and memory usage by limiting the amount of data retrieved from a database. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
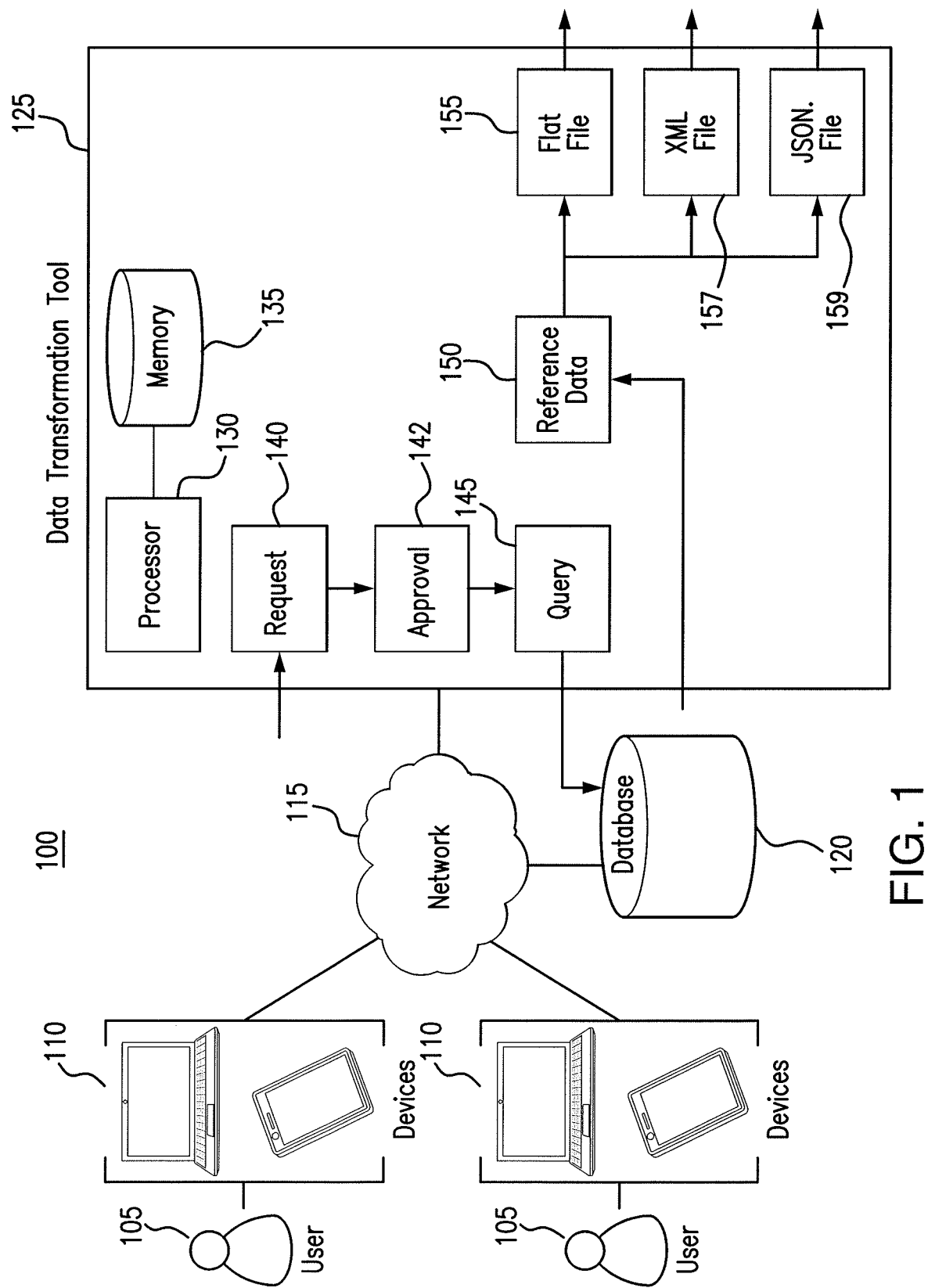
FIG. 1 illustrates a system for data transformation.
Figure 2:
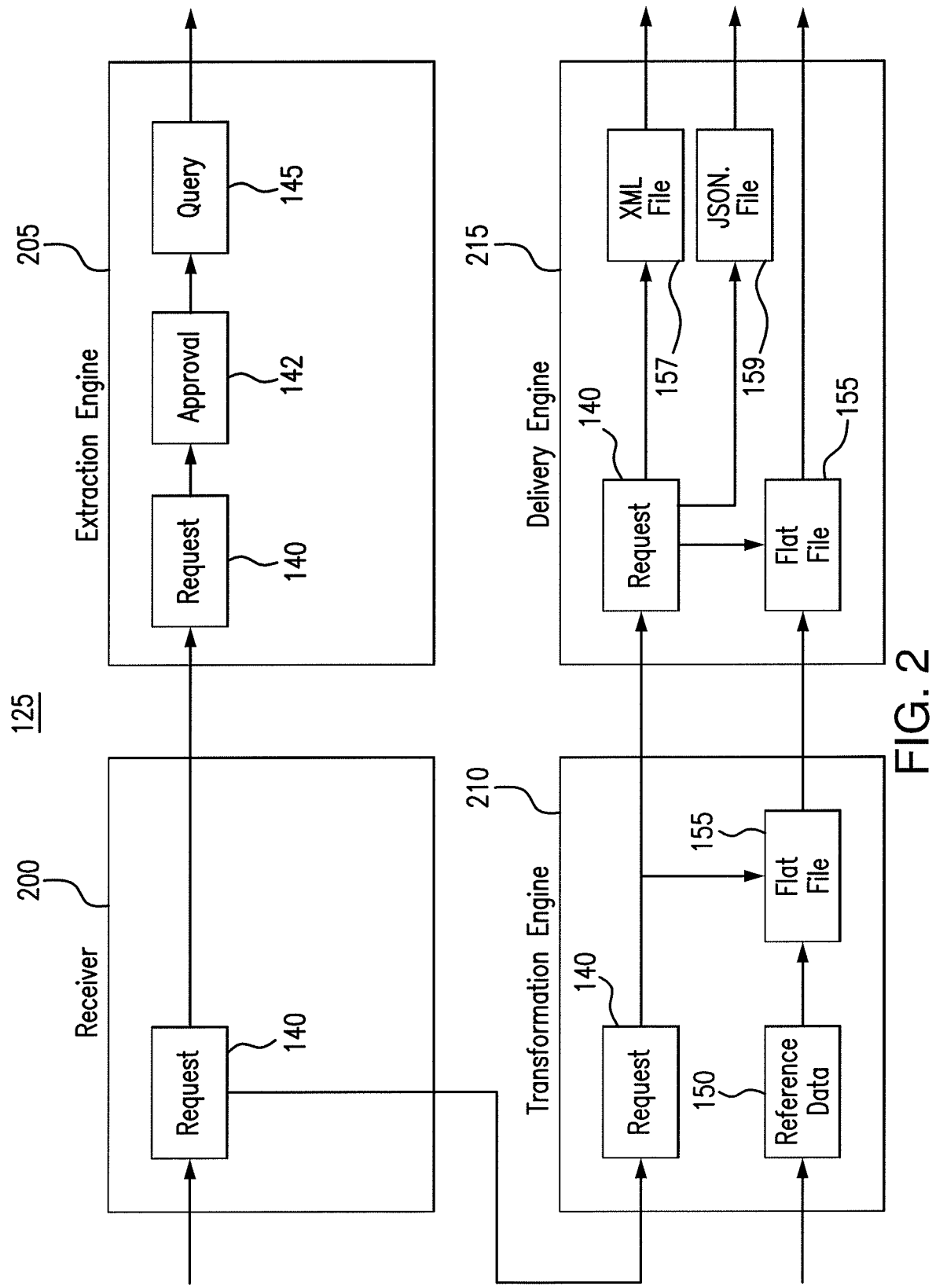
FIG. 2 illustrates the data transformation tool of the system of FIG. 1.
Figure 3:
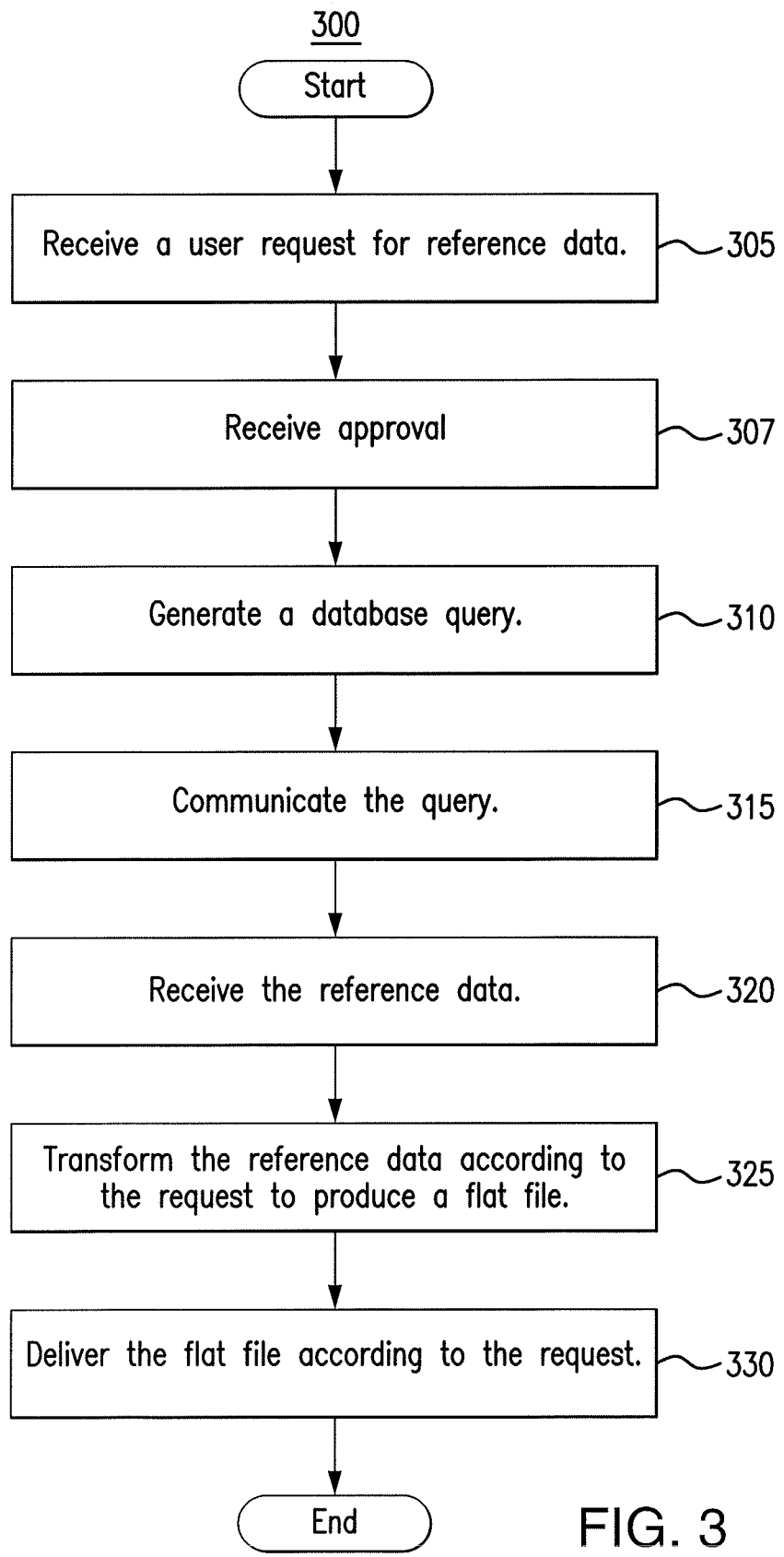
FIG. 3 is a flowchart illustrating a method for transforming data using the system of FIG. 1.

Embodiments of the present disclosure and its advantages are best understood by referring to FIGS. 1 through 3 of the drawings, like numerals being used for like and corresponding parts of the various drawings.

An organization may use databases to store data about itself and its clients. These databases may be central repositories that store a large amount of information. The organizations may include several smaller organizations or departments that use only a subset of this stored information. For example, an organization may keep a database that stores all of its customers' purchase information. The organization may include an engineering department and a sales department that each accesses this purchase information. However, the engineering department may use a different subset of the purchase information than the sales department.

To improve database usage and query response times, separate departments may create their own databases using the subset of information from the central database. For example, the engineering department may create a database of its own using the subset of purchase information that it typically retrieves from the central database. By generating its own database, the department may reduce the strain on the central database and may improve query response times by reducing the amount of information in the database.

In conventional systems, to generate these new databases, a certain type of information is needed from the central database. This information is known as reference data. Reference data indicates the types of values stored in the database along with any limitations and descriptions of those values. For example, a database of customer purchases may store the dates of those purchases. The reference data for this database may indicate that the date must have a month that is an integer from one to twelve. As another example, the reference data may indicate that the revenue generated by a sale must be a number that is greater than zero. The reference data is used when creating a new database to set parameters and limits on the new database. The reference data may be used to specify the types of information that is being used to populate the database. Using the reference data it is possible to create populated tables of data and then to validate that data which are important steps when creating a new database using old information.

Reference data is useful when the new database that is being created is of the same type as the central database. However, if the new database is of a different type or if the new database stores information using different formats, then the retrieved reference data from the central database may not be helpful in creating the new database. In such instances, users may need the reference data to have a different form or layout. However, the central database may be technically limited because in that it is not capable of formatting the reference data into a different format.

This disclosure contemplates an unconventional data transformation tool that transforms reference data into a requested format. The data transformation tool receives a request from a user for reference data in a particular format. The data transformation tool then retrieves the reference data from the database and transforms it to the specified format. The transformation process transforms the reference data into a flat file. The data transformation tool then communicates the flat file to the user using a user specified delivery method.

In particular embodiments, by using the data transformation tool, a new database may be created that reduces the strain on and usage of the central database. Furthermore, the data transformation tool allows databases of different types and formats to be created using reference data from a central database. Thus, the data transformation tool addresses a problem that is inherent in computer technology, specifically, database creation. As a result, the data transformation tool improves underlying computer technology by allowing databases of any type to be created from a central database in an unconventional manner.

The data transformation tool will be described generally using FIG. 1. FIGS. 2 and 3 will describe the data transformation tool in more detail.

FIG. 1 illustrates a system 100 for data transformation. As illustrated in FIG. 1, system 100 includes devices 110, network 115, database 120, and data transformation tool 125. In particular embodiments, system 100 improves the database creation process by transforming reference data into any requested format. The transformed reference data can be used to create a new database that is of a different type than database 120.

Devices 110 may be used to create new databases using information from database 120. Devices 110 may be any appropriate device for communicating with components of system 100 over network 115. For example, devices 110 may be a telephone, a mobile phone, a computer, a laptop, a tablet and/or an automated assistant. This disclosure contemplates device 110 being any appropriate device for sending and receiving communications over network 115. As an example and not by way of limitation, device 110 may be a computer, a laptop, a wireless or cellular telephone, an electronic notebook, a personal digital assistant, a tablet, or any other device capable of receiving, processing, storing, and/or communicating information with other components of system 100. Device 110 may also include a user interface, such as a display, a microphone, keypad, or other appropriate terminal equipment usable by user 105. In some embodiments, an application executed by device 110 may perform the functions described herein.

Network 115 facilitates communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Database 120 stores information that can be used by devices 110. For example, database 120 may store particular data fields that contain values used by devices 110 to generate reports and perform analysis. Database 120 also includes a type of information called reference data. Reference data is a type of data that describes the information in database 120. For example, reference data may specify a particular data field such as, for example, a purchase date, and then list permissible values for the data field. In the example of a purchase date, the list of permissible values may indicate that the month must be an integer from one to twelve. As another example, if the data field is a purchase amount, then the list of permissible values may indicate that the purchase amount must be a value greater than zero. In certain embodiments, the reference data may also include a textual description of the data field. In the example of the purchase data, the textual description may state that the purchase date is the date on which the purchase occurred. In the example of the purchase amount, the textual description may state that the purchase amount is the amount of revenue generated by a purchase.

Users 105 may use devices 110 to create new databases from the information in database 120. By creating new databases, users 105 may have access to a separate and smaller database that contains information that users 105 may want to access. In this manner, users 105 and devices 110 may avoid sending queries to database 120 thereby reducing the strain on database 120. Furthermore, query speeds may be increased because the size of new database is smaller than the size of database 120. As a result, the underlying computer database technology is improved.

To generate the new database, the reference data from database 120 may be needed to set up the tables in the new database. For example, the identification of data fields and the list of permissible values and the textual description of data fields may be needed to create new tables and to set values and types on the new tables. However, in some instances, users 105 may wish to create a new database that is of a different type than database 120. For example, database 120 may be a relational database and the new database may be a non-relational database. In this case, the reference data from database 120 may need to be transformed or reformatted in order to be used to create the new database. If the reference data is not reformatted and/or transformed, then the new database may be created with errors.

Data transformation tool 125 transforms reference data into a flat file to be used in the creation of the new database. As illustrated in FIG. 1, data transformation tool 125 includes a processor 130 and a memory 135. This disclosure contemplates processor 130 and memory 135 being configured to perform any of the functions of data transformation tool 125 described herein.

Processor 130 is any electronic circuitry, including, but not limited to microprocessors, application specific integrated circuits (ASIC), application specific instruction set processor (ASIP), and/or state machines, that communicatively couples to memory 135 and controls the operation of data aggregator 125. Processor 130 may be 8-bit, 16-bit, 32-bit, 64-bit or of any other suitable architecture. Processor 130 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 130 may include other hardware and software that operates to control and process information. Processor 130 executes software stored on memory to perform any of the functions described herein. Processor 130 controls the operation and administration of data aggregator 125 by processing information received from network 115, device(s) 110, and memory 135. Processor 130 may be a programmable logic device, a microcontroller, a microprocessor, any suitable processing device, or any suitable combination of the preceding. Processor 130 is not limited to a single processing device and may encompass multiple processing devices.

Memory 135 may store, either permanently or temporarily, data, operational software, or other information for processor 130. Memory 135 may include any one or a combination of volatile or non-volatile local or remote devices suitable for storing information. For example, memory 135 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 135, a disk, a CD, or a flash drive. In particular embodiments, the software may include an application executable by processor 130 to perform one or more of the functions described herein.

Data transformation tool 125 receives a request 140 from a user 105 or device 110. Request 140 may request that a new database be created using information from database 120. Request 140 may also indicate that the new database may be of a different type than database 120. For example, request 140 may include an identifier for reference data, a format, and a delivery type. The identifier for reference data may identify certain pieces of reference data that should be retrieved from database 120. The format may indicate the transformation that should be performed on the reference data to prepare it for the new database. In some instances, the format may be based on the type of database that new database is. The delivery type may indicate the format and/or style of delivery of the transformed reference data.

In certain instances, database 120 may protect requested information so that it is not accessible by all users. In these instances, data transformation tool 125 may seek approval to access information requested in request 140. In response, data transformation tool 125 may receive approval 142 that indicates that the requested information may be accessed. This disclosure contemplates approval 142 being granted or denied based on any criteria (e.g., user, time of day, information requested, etc.). When approval 142 is granted, data transformation tool 125 may generate a query 145 to access the requested information. In some embodiments, approval 142 is not required before generating query 145.

Data transformation tool 125 generates a query 145 based on request 140. Query 145 may be used to retrieve and/or extract reference data from database 120. For example, query 145 may be a Structure Query Language (SQL) query for a SQL database. Data transformation tool 125 may communicate query 145 to database 120 to extract reference data from database 120.

Data transformation tool 125 may receive the requested reference data 150 from database 120. Reference data 150 may identify data fields and the permissible values for those data fields and in some instances a textual description of those data fields. Reference data 150 may be used to create a new database.

Data transformation tool 125 transforms reference data 150 based on the format indicated in request 140. For example, reference data 150 may be for a relational database and data transformation tool 125 may transform data 150 to be for a non-relational database. After transforming reference data 150, data transformation tool 125 produces a flat file 155. Data transformation tool 125 can also transform reference data 150 to produce an Extensible Markup Language (XML) file 157 and/or a JavaScript Object Notation (JSON) file 159. Data transformation tool 125 may generate XML file 157 and/or JSON file 159 as alternatives or in addition to flat file 155.

Data transformation tool 125 delivers flat file 155 to devices 110 and/or users 105 according to the delivery type indicated by request 140. For example, data transformation tool 125 may deliver flat file 155 using the file transfer protocol, the secure transfer protocol, network data mover, and/or by email. Users 105 and/or devices 110 may receive flat 155 and use flat file 155 to create a new database.

In particular embodiments, by using data transformation tool 125, users 105 and devices 110 may create new databases that are of a different type than database 120 using reference data from database 120. Because data transformation tool 125 transforms reference data 150 into flat file 155, flat file 155 may be used to create a new database of a type that is different from database 120. Furthermore, because users 105 and devices 110 can include in request 140 a format of their choosing, data transformation tool 125 may simplify the database creation process by generating a flat file 155 for a new database of any type.

FIG. 2 illustrates the data transformation tool 125 of the system 100 of FIG. 1. As illustrated in FIG. 2, data transformation tool 125 includes a receiver 200, an extraction engine 205, a transformation engine 210 and a delivery engine 215. In particular embodiments, by using data transformation tool 125, a database of any type may be created using information and reference data from a database 120.

Receiver 200 receives information intended for data transformation tool 125. For example, receiver 200 may receive request 140 from a user and/or device. As another example, receiver 200 may receive reference data 150 from a database. Receiver 200 may forward received information to the appropriate elements of data transformation tool 125. For example, receiver 200 may forward request 140 to extraction engine 205 and transformation engine 140. An example algorithm for receiver 200 is: wait for request 140, receive request 140 from requesting device through a network, send request 140 to extraction engine 205 and/or transformation engine 210.

Extraction engine 205 may receive request 140 from receiver 200. In some instances, extraction engine 205 may seek and receive approval 142 to access information requested by request 140. Extraction engine 205 may analyze request 140 to generate query 145. For example, request 140 may include an identifier of reference data that is to be retrieved from a database. Based on that identification of reference data, extraction engine 205 may generate query 145 to retrieve the requested reference data. Extraction engine 205 may generate any type of query 145 to extract or retrieve data from any type of database. Extraction engine 205 may then communicate query 145 to a database to retrieve reference data. An example algorithm for extraction engine 205 is: receive request 140 from receiver 200, determine information requested by request 140, receive approval 142 to access requested information, generate query 145 to retrieve requested information.

Transformation engine 210 may receive request 140 from receiver 200. Transformation engine 210 may also receive reference data 150 from a database. In some embodiments, transformation engine 210 may receive reference data 150 from receiver 200. Receiver 200 may receive reference data 150 from a database. Transformation engine 210 may generate flat file 155 using reference data 150 and request 140. In some embodiments, transformation engine 210 transforms reference data 150 based on a format indicated by request 140. The format may correspond to the type of new database that a user intends to create. Flat file 155 may include reference data 150 that has been transformed to create a new database of a different type than the database that stored reference data 150. Transformation engine 210 can also transform reference data 150 into XML file 157 and/or JSON file 159 as an alternative to or in addition to flat file 155. Request 140 may indicate whether reference data 150 should be transformed into flat file 155, XML file 157, and/or JSON file 159. Transformation engine 210 may then communicate flat file 155 to delivery engine 215. An example algorithm for transformation engine 210 is: receive request 140, receive reference data 150 from a database, determine a format indicated by request 140, transform reference data 150 into format indicated by request 140.

Delivery engine 215 may deliver flat file 155 based on a delivery type indicated by request 140. Delivery engine 215 may have received request 140 from transformation engine 210 or receiver 200. Delivery engine 215 may then communicate flat file 155 using the indicated delivery type. For example, delivery engine 215 may deliver flat file 155 using the file transfer protocol, the secure file transfer protocol, network data mover and/or email. A user and/or a device may then receive the flat file 155 and use flat file 155 to create a new database. Delivery engine 215 may also delivery XML file 157 and/or JSON file 159 using the requested delivery type. In some embodiments, delivery engine 215 may transform reference data 150 into XML file 157 and/or JSON file 159 rather than transformation engine 210. An example algorithm for delivery engine 215 is: receive request 140, determine a delivery type in request 140, receive flat file 155, delivery flat file 155 using the requested delivery type.

In some embodiments, delivery engine 215 divides flat file 155 into smaller portions for delivery. For example, request 140 may indicate that flat file 155 should be divided into portions of a particular maximum size. In response, delivery engine 215 may divide flat file 155 into smaller portions that are smaller than the indicated file size maximum.

In certain embodiments, delivery engine 215 delivers flat file 155 based on a schedule set by a requesting user. For example, the user may request that flat file 155 be delivered in two days. In such an instance, delivery engine 215 may hold flat file 155 for two days and then deliver according to that schedule.

In particular embodiments, data transformation tool 125 further includes a logging engine that maintains a log of transactions conducted by data transformation tool 125. For example, the log may include information from request 140, such as the identifier of reference data, the format and the delivery type. The log may also include information about a requesting user, such as the user's IP address, operating system and machine or device name. The logging engine may add this information to the log when a request 140 is received and/or when a flat file 155 is generated and/or delivered. An example algorithm for logging engine is: create a log, receive request 140, determine an identifier for reference data in request 140, determine a format and delivery type in request 140, add the determined identifier, format, and delivery type to the log.

In certain embodiments, data transformation tool 125 further includes a validation engine that determines whether reference data in flat file 155 matches reference data 150 indicated by request 140. For example, the validation engine may analyze flat file 155 to ensure that the transformation process was performed correctly. If the transformation process was not performed correctly, flat file 155 may be inconsistent with reference data 150 and data transformation tool 125 may need to perform the transformation process again. An example algorithm for validation engine is: receive request 140, receive flat file 155, analyze each line of flat file 155, determine whether an error occurred in a line of flat file 155, communicate an alert indicating the error if it exists.

In particular embodiments, by using data transformation tool 125 the database creation process may be improved. For example, data transformation tool 125 transforms reference data into flat file 155 so that a new database of any type can be created regardless of the type of the source database.

FIG. 3 is a flowchart illustrating a method 300 for transforming data using the system 100 of FIG. 1. In certain embodiments, data transformation tool 125 performs method 300. By performing method 300, data transformation tool 125 improves the database creation process by allowing a new database of any type to be created regardless of the type of the source database.

Data transformation tool 125 begins by receiving a user request for reference data in step 305. The request may include an identifier for particular reference data, a format, and a delivery type. In step 307, data transformation tool 125 receives approval to access information requested by the request.

In step 310, data transformation tool 125 generates a database query. The database query may be generated based on the request. For example, the query may request the reference data identified by the request.

Data transformation tool 125 then communicates the query in step 315. The query may be communicated to a database that stores the requested reference data. In step 320, data transformation tool 125 receives the requested reference data. Data transformation tool 125 then transforms the reference data according to the request to produce a flat file in step 325. The transformation may be performed based on the request. For example, the request may include a format and the reference data may be transformed according to that format. In this manner, the reference data is transformed into a flat file according to the indicated format.

In step 330, data transformation tool 125 delivers the flat file according to the request. For example, the request can indicate that the flat file is to be delivered according to a particular mechanism or protocol, such as email. Data transformation tool 125 may send the flat file according to the indicated mechanism. The recipient of the flat file may then use the flat file to create a new database.

Modifications, additions, or omissions may be made to methods 300 and 500 depicted in FIG. 3. Method 300 may include more, fewer, or other steps. For example, steps may be performed in parallel or in any suitable order. While discussed as database transformation tool 125 (or components thereof) performing the steps, any suitable component of system 100, such as device(s) 110 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A data transformation tool comprising:
a memory; and
a hardware processor configured to:
receive from a user device a request indicating an identifier for reference data, a format, and a delivery type, wherein the reference data includes a data field, a list of permissible values for the data field, and a textual description of the data field, wherein the format indicates transforming the reference data from a relational database format to a non-relational database format;
identify a user associated with the request;
identify a requested information type based on the reference data;
approve the request based on the user and the requested information type;
generate, based on the request, a database query requesting reference data identified by the identifier from a first database;
communicate the query to the first database;
receive, from the first database, the reference data in response to communicating the query to the first database;
transform the reference data from the relational database format to the non-relational database format;
transform the reference data into a flat file based on the format indicated by the request;
divide the flat file into a plurality of flat files based on the request;
deliver the flat file as the plurality of flat files to the user device according to the delivery type indicated by the request, wherein the user device is configured to generate, using the flat file, a second database that stores information according to the format indicated by the request, the format is different from another format used by the first database to store information;
add the identifier, the format indicated by the request, the delivery type, the user device's IP address, the user device's operating system, and the user device's name to a log; and
determine that the reference data in the flat file matches the reference data identified by the user request.

2. The data transformation tool of claim 1, wherein the reference data identifies a data field in the first database.

3. The data transformation tool of claim 1, wherein the reference data identifies a permissible value of a data field in the first database.

4. The data transformation tool of claim 1, wherein the delivery type is one or more of the file transfer protocol, the secure file transfer protocol, network data mover, and email.

5. The data transformation tool of claim 1, wherein the reference data provides a textual description of a data field in the first database.

6. The data transformation tool of claim 1, wherein the hardware processor is further configured to deliver the flat file to the user device based on a schedule set by the user.

7. The data transformation tool of claim 1, wherein approval for the request is received before the hardware processor receives the reference data from the first database.

8. A method comprising:
receiving from a user device a request indicating an identifier for reference data, a format, and a delivery type, wherein the reference data includes a data field, a list of permissible values for the data field, and a textual description of the data field, wherein the format indicates transforming the reference data from a relational database format to a non-relational database format;
identifying a user associated with the request;
identifying a requested information type based on the reference data;
approving the request based on the user and the requested information type;
generating, based on the request, a database query requesting the reference data identified by the identifier from a first database;
communicating the query to the first database;
receiving, from the first database, the reference data in response to communicating the query to the first database;
transforming the reference data from the relational database format to the non-relational database format;
transforming the reference data into a flat file based on the format indicated by the request;
dividing the flat file into a plurality of flat files based on the request;
delivering the flat file as the plurality of flat files to the user device according to the delivery type indicated by the request, wherein the user device is configured to generate, using the flat file, a second database that stores information according to the format indicated by the request, the format is different from another format used by the first database to store information;
adding the identifier, the format indicated by the request, the delivery type, the user device's IP address, the user device's operating system, and the user device's name to a log; and
determining that the reference data in the flat file matches the reference data identified by the user request.

9. The method of claim 8, wherein the reference data identifies a data field in the first database.

10. The method of claim 8, wherein the delivery type is one or more of the file transfer protocol, the secure file transfer protocol, network data mover, and email.

11. The method of claim 8, wherein the reference data provides a textual description of a data field in the first database.

12. The method of claim 8, further comprising delivering the flat file to the user device based on a schedule set by the user.

13. The method of claim 8, wherein approval for the request is received before receiving the reference data from the first database.

14. A system comprising:
a user device;
a first database configured to store reference data, wherein the reference data includes a data field, a list of permissible values for the data field, and a textual description of the data field, wherein the first database is configured to the reference data in a relational database format; and a data transformation tool comprising a hardware processor communicatively coupled to a memory, the hardware processor configured to:
  receive from the user device a request indicating an identifier for reference data, a format, and a delivery type, wherein the format indicates transforming the reference data from the relational database format to a non-relational database format;
  identify a user associated with the request;
  identify a requested information type based on the reference data;
  approve the request based on the user and the requested information type;
  generate, based on the request, a database query requesting the reference data identified by the identifier from the first database;
  communicate the query to the first database;
  receive, from the first database, the reference data in response to communicating the query to the first database;
  transform the reference data from the relational database format to the non-relational database format;
  transform the reference data into a flat file based on the format indicated by the request;
  divide the flat file into a plurality of flat files based on the request;
  deliver the flat file as the plurality of flat files to the user device according to the delivery type indicated by the request, wherein the user device is configured to generate, using the flat file, a second database that stores information according to the format indicated by the request, the format is different from another format used by the first database to store information;
  add the identifier, the format indicated by the request, the delivery type, the user device's IP address, the user device's operating system, and the user device's name to a log; and
  determine that the reference data in the flat file matches the reference data identified by the user request.

15. The system of claim 14, wherein the reference data identifies a data field in the first database.

16. The system of claim 14, wherein the reference data identifies a permissible value of a data field in the first database.

17. The system of claim 14, wherein the delivery type is one or more of the file transfer protocol, the secure file transfer protocol, network data mover, and email.

18. The system of claim 14, wherein the reference data provides a textual description of a data field in the first database.

19. The system of claim 14, wherein the hardware processor is further configured to deliver the flat file to the user device based on a schedule set by the user.

20. The system of claim 14, wherein approval for the request is received before the hardware processor receives the reference data from the first database.

* * * * *